Patented Oct. 25, 1949

2,486,024

UNITED STATES PATENT OFFICE 2,486,024

PREPARATION OF POLYALKYLENE GLYCOLS

George W. Hearne, El Cerrito, and Harry L. Yale, Berkeley, Calif., assignors to Shell Development Company, San Francisco, Calif., a corporation of Delaware No Drawing. Application August 19, 1947, Serial No. 769,544

6 Claims. (Cl. 260—615)

This invention relates to a method for the preparation of compounds having structures corresponding to the formula $$HO-(CR_2)_n-O-(CR_2)_2-CH_2-O-(CR_2)_n-OH$$

in which each R represents a member of the class consisting of the hydrogen atom and the alkyl radicals, the several R's being the same or different, and $n$ represents an integral number greater than 1 and less than 4.

Representative compounds having structures corresponding to the above formula include, among others, the following:

1,3-bis(2-hydroxyethoxy)propane
$$HO-CH_2CH_2-O-CH_2CH_2CH_2-O-CH_2CH_2-OH$$

1,3-bis(2-hydroxypropoxy)propane
$$HO-CHCH_2-O-CH_2CH_2CH_2-O-CH_2CH-OH$$
$$\quad\quad\;\; |\quad\quad\quad\quad\quad\quad\quad\quad\quad\quad\quad\quad\quad |$$
$$\quad\quad\; CH_3\quad\quad\quad\quad\quad\quad\quad\quad\quad\quad\quad CH_3$$

1,3-bis(2-hydroxyethoxy)-2-methylpropane
$$HO-CH_2CH_2-O-CH_2CHCH_2-O-CH_2CH_2-OH$$
$$\quad\quad\quad\quad\quad\quad\quad\quad\quad\;\; |$$
$$\quad\quad\quad\quad\quad\quad\quad\quad\quad CH_3$$

1,3-bis(2-hydroxy-1-methylethoxy)butane
$$HO-CH_2CH-O-CHCH_2CH_2-O-CHCH_2-OH$$
$$\quad\quad\quad\;\; |\quad\quad\;\; |\quad\quad\quad\quad\quad\quad\quad\; |$$
$$\quad\quad\;\; CH_3\quad CH_3\quad\quad\quad\quad\quad\;\; CH_3$$

1,3-bis(2-hydroxypentoxy)-2-ethylbutane
$$HO-CHCH_2-O-CHCHCH_2-O-CH_2CH-OH$$
$$\quad\;\; |\quad\quad\quad\quad\;\; |\;\;\;\; |\quad\quad\quad\quad\quad\;\; |$$
$$\;\; C_3H_7\quad\quad CH_3\; C_2H_5\quad\quad\quad C_3H_7$$

1-(2-hydroxyethoxy)-3-(2-hydroxypropoxy)propane
$$HO-CH_2CH_2-O-CH_2CH_2CH_2-O-CH_2CH-OH$$
$$\quad\quad\quad\quad\quad\quad\quad\quad\quad\quad\quad\quad\quad\quad\quad\quad |$$
$$\quad\quad\quad\quad\quad\quad\quad\quad\quad\quad\quad\quad\quad\quad\; CH_3$$

1,3-bis(2-hydroxy-1-methylbutoxy)-2-ethylpentane
$$HO-CHCH-O-CHCHCH_2-O-CHCH-OH$$
$$\quad\;\; |\quad\;\; |\quad\quad\;\; |\;\;\;\; |\quad\quad\quad\quad\;\; |\;\;\; |$$
$$\;\; CH_3\; C_2H_5\quad C_2H_5\quad\quad\quad\; H_3C\; C_2H_5$$
$$\;\; C_2H_5\quad\quad\;\; C_2H_5$$

1,3-bis(2-hydroxy-2-methylpropoxy)-3-methylbutane
$$\quad\quad\;\; CH_3\quad\quad\;\; CH_3\quad\quad\quad\quad\;\; CH_3$$
$$\quad\quad\;\; |\quad\quad\quad\quad\; |\quad\quad\quad\quad\quad\quad |$$
$$HO-CCH_2-O-CCH_2CH_2-O-CH_2C-OH$$
$$\quad\quad\;\; |\quad\quad\quad\quad\; |\quad\quad\quad\quad\quad\quad |$$
$$\quad\quad\;\; CH_3\quad\quad\;\; CH_3\quad\quad\quad\quad\;\; CH_3$$

1,3-bis(3-hydroxypropoxy)propane
$$HO-CH_2CH_2CH_2-O-CH_2CH_2CH_2-O-CH_2CH_2CH_2-OH$$

1,3-bis(3-hydroxy-2-methylpropoxy)propane
$$HO-CH_2CHCH_2-O-CH_2CH_2CH_2-O-CH_2CHCH_2-OH$$
$$\quad\quad\quad\;\; |\quad\quad\quad\quad\quad\quad\quad\quad\quad\quad\quad\quad\quad\quad\;\; |$$
$$\quad\quad\;\; CH_3\quad\quad\quad\quad\quad\quad\quad\quad\quad\quad\quad\quad\;\; CH_3$$

1,3-bis(3-hydroxy-1,2,2-trimethylpropoxy)-2-methylpropane
$$\quad\quad\; CH_3\quad\quad\quad\quad\quad\quad\quad\quad\quad CH_3$$
$$\quad\quad\; |\quad\quad\quad\quad\quad\quad\quad\quad\quad\quad\quad |$$
$$HO-CH_2CCH-O-CH_2CHCH_2-O-CHCCH_2-OH$$
$$\quad\quad\quad\; |\;\; |\quad\quad\quad\quad\; |\quad\quad\quad\quad\quad |\;\; |$$
$$\quad\quad\; H_3C\; CH_3\quad\quad CH_3\quad\quad\quad\;\; H_3C\; CH_3$$

1,3-bis(3-hydroxypropoxy)-2-methylpropane
$$HO-CH_2CH_2CH_2-O-CH_2CHCH_2-O-CH_2CH_2CH_2-OH$$
$$\quad\quad\quad\quad\quad\quad\quad\quad\quad\quad\quad |$$
$$\quad\quad\quad\quad\quad\quad\quad\quad\quad\; CH_3$$

and homologs and analogs thereof.

According to the present invention, compounds corresponding in structure to the above generic structural formula, are prepared by reacting with hydrogen in the presence of a hydrogenation catalyst a heterocyclic compound having a structure represented by the structural formula $$HO-(CR_2)_n-O-(CR_2)_2-HC\underset{O}{\overset{O}{\diagdown\!\!\!\diagup}}CR_2)_n$$

in which R and $n$ have their previous significance. It was unexpected to discover that the compounds having the immediately foregoing structure formed, when treated with hydrogen in the presence of a hydrogenation catalyst under suitable conditions, the acyclic polyalkylene glycols corresponding to the first-given generic structural formula. It also was unexpected to discover further that these acyclic polyalkylene glycols could be prepared in the foregoing manner with an efficiency and at a cost which would render the method for their preparation attractive from the standpoint of execution on a commercial scale. The prior art experiments in which derivatives of 1,3-dioxolane having aliphatic groups attached to carbon atoms in the heterocyclic ring have been catalytically hydrogenated, would lead one to expect results substantially different from those that have been obtained in the present invention. According to Fischer, Baer, and Feldmann, Berichte, 63B, 1732–44 (1930), catalytic hydrogenation of 2,2-dimethyl-4-methylene-1,3-dioxolane forms the corresponding saturated derivative 2,2,4-trimethyl-1,3-dioxolane, the theoretical amount of hydrogen being absorbed. Similarly, the catalytic hydrogenation of 2-(1-ethyl-1-pentenyl)-1,3-dioxolane is shown in U. S. Patent No. 2,383,622 to form 2-(1-ethylpentyl)-1,3-dioxolane. In neither instance is there indication of fission of the heterocyclic ring at one of the carbon-to-oxygen bonds, the results suggesting to the contrary, that the 1,3-dioxolane ring is highly stable to the action of hydrogen when there is an aliphatic group attached to the carbon atom in the 2-position thereof.

The products which are prepared in accordance with the present invention are highly useful as special solvents, as plasticizers, and in similar applications. We have found, contrary to what would be anticipated from the prior art disclosures, that these valuable products may be prepared in an efficient and economical manner by reacting derivatives of 1,3-dioxolane and 1,3-dioxane having a 2-(hydroxyalkoxy)-alkyl substituent group attached to the carbon atom in the 2-position of the heterocyclic ring, with hydrogen in the presence of a suitable hydrogenation catalyst under the hereinafter described conditions of temperature, and pressure of hydrogen which favor appreciable and substantial absorption of hydrogen. The derivatives of 1,3-dioxolane and of 1,3-dioxane which are employed in the process of the invention may be prepared in known manners from low-cost and readily available raw materials. The new process, which is the subject of the present invention, provides an improved and an economical and effective method of preparing complex polyalkylene glycols of the class defined herein. Many of these useful products heretofore could have been prepared only at a considerably greater cost or from less readily available raw materials.

According to the broad concepts of the invention, any suitable hydrogenation catalyst may be employed in the execution of the process of the invention. Suitable hydrogenation catalysts comprise those hydrogenation catalysts which have sufficient activity to promote the desired reaction at a practical rate under effective conditions of temperature, pressure of hydrogen, time, amount of the catalyst, and the like and which, in conjunction with the conditions of temperature, pressure of hydrogen, time, amount of the catalyst, and the like, do not favor the occurrence of excessive side reactions, decomposition, or other undesired reactions. A suitable catalyst may be any member or combination of members selected from the group composed of materials known to the art as "hydrogenation catalysts." Hydrogenation catalysts selected from the group composed of the metals and the oxides and the sulfides of metals, or mixtures comprising one or more metals and/or oxides and/or sulfides of metals are catalysts which may be employed. The several components, if more than one is present, may be physically mixed, chemically combined, or otherwise united as in alloys of two or more metals. Suitable metals and compounds of metals which may be employed as the hydrogenation catalyst include, for example, noble metals, e. g., platinum, palladium, gold, etc., and base metals such as nickel, tungsten molybdenum, cerium, cobalt, thorium, chromium, zirconium, copper, and the like, and mixtures and alloys of the same, and oxides and sulfides of the same.

It is preferred to employ as the hydrogenation catalyst a metal or compound of a metal which has a relatively high degree of activity under the conditions that are employed and with respect to the compounds that are subjected in the process to the action of the hydrogen. From the standpoint of their cost, the ease with which they may be prepared, and their efficacy in the process to which the invention is directed, the base metal hydrogenation catalysts are particularly desirable. Such base-metal catalysts may be employed in a finely divided state or deposited on or supported upon a suitable carrier material. It is particularly desirable to employ as the hydrogenation catalyst the pyrophoric base metals of group VIII of the periodic table of the elements, that is, pyrophoric nickel, cobalt and iron. Because of its high initial activity, and its low cost and the relatively long periods of time over which it retains its activity, highly satisfactory results have been obtained with a pyrophoric nickel catalyst, such as Raney nickel catalyst. These and equivalent catalysts may be used singly or in combination, and may be used in either the essentially pure state or deposited on a suitable inert or catalytically active carrier, such as pumice, kieselguhr, charcoal, or the like. The activity of the catalyst may be enhanced, if desired, by the incorporation therewith of one or more promotors, such as the high melting and difficultly reducible oxygen-containing compounds, e. g., oxides and oxygen containing salts, of the alkaline earth and rare earth metals, such as of magnesium, aluminum, copper, thorium, manganese, zinc, boron, etc.

The amount of the catalyst, relative to the amount of the compound that is employed as the organic reactant in the process of the invention, may be varied within relatively wide limits, provided a sufficient quantity is employed to effect the desired reaction in a practicable manner. Amounts of the hydrogenation catalyst from as little as 0.2% up to 35% or more by weight of the heterocyclic reactant of the herein defined class generally are suitable. The optimum amount of the catalyst that may be employed in any given instance depends to a certain extent upon the activity of the catalyst and upon the particular reaction conditions that are employed and upon the heterocyclic reactant that is involved. It is preferred to employ from about 1% to about 25% by weight of the catalyst, based on the weight of the organic reactant, although either more or less may be employed if desirable in any specific instance.

In the execution of the process of the present invention, the heterocyclic reactant is subjected to the action of hydrogen in the presence of the hydrogenation catalyst under conditions of temperature and pressure such that appreciable and substantial absorption of hydrogen occurs. We have found that relatively high temperatures favor the desired reaction, provided the temperature does not exceed a temperature at which excessive decomposition occurs. To a certain extent the temperature that may be employed depends upon the particular catalyst that is used and the other conditions under which the reaction is effected. In some cases temperatures as low as 150° C. may be employed. It generally is preferred to employ temperatures of at least 200° C. The maximum temperature that may be employed is determined primarily by the thermal stability of the organic materials that are present, and may be varied accordingly. Temperatures as high as 400° C. may be employed at times, although temperatures not over about 300° C. are preferable because of the possibility that at the higher temperatures excessive decomposition of organic materials may occur.

If the catalyst and the heterocyclic compound reactant are initially mixed, as at ordinary room temperatures, and heated under an atmosphere of hydrogen at a suitably elevated pressure, it has been observed that there may exist a minimum temperature below which substantially no absorption of hydrogen occurs, but above which absorption of hydrogen takes place at a measurable and practical rate, with formation of the products that are desired in accordance with the invention. The particular temperature at which absorption of hydrogen is thus initiated is not susceptible to numerical definition in a manner that is applicable to all cases, since it depends to a certain extent upon the catalyst that is employed, the heterocyclic reactant of the present class that is involved, and upon the other conditions under which the reaction is effected. In any given case, the onset of hydrogen absorption may be easily determined by the operator with the aid of methods that are well known to the art, such as by measurement of the pressure of hydrogen and any changes therein. As one example of the effect of the temperature in the process of the present invention, absorption of hydrogen was first noted at a temperature of about 245° C. when 2-[2-(2-hydroxyethoxy)ethyl]-1,3-dioxolane was treated with hydrogen in the presence of Raney nickel catalyst. On the other hand, in the presence of Raney nickel catalyst, absorption of hydrogen in the treatment of 2-[2-(2-hydroxypropoxy)ethyl]-4-methyl-1,3-dioxolane was first noted at a temperature of about 225° C., while in the presence of a platinum oxide hydrogenation catalyst hydrogen absorption was first noted at about 230° C. In this latter instance, more decomposition occurred than in the other cases, illustrating the superiority of the nickel catalysts. In each experiment, the dioxolane derivative and the catalyst were placed in a suitable pressure resistant vessel; the vessel was filled with hydrogen under pressure and the closed vessel was heated with agitation of its contents. The pressure in the interior of the vessel was determined by means of a suitable high pressure manometer connected therewith. As the temperature was increased, the pressure inside the vessel rose because of the expansion of the contents until, at the indicated temperatures, an abrupt decrease in the rate of pressure rise was observed, indicating absorption of hydrogen.

The process of the present invention may be executed in either a batchwise, an intermittent, or a continuous manner. As illustrated in the preceding paragraph, the catalyst and the heterocyclic reactant may be placed in a suitable pressure resistant reaction vessel and subjected to the action of hydrogen under an elevated pressure and at a suitably elevated pressure. Equally within the scope of the invention is the practice of the process of the invention by a continuous process, for example by passing a stream of the organic reactant over or through a bed of the catalyst at an effective temperature and in the presence of hydrogen under a pressure greater than atmospheric.

In the execution of the process of the invention, hydrogen pressures of from about 1000 pounds per square inch upwards are satisfactory. There is no known upper limit to the pressure of hydrogen that may be employed, subject, of course, to the mechanical strength of the reaction vessel or system that is employed. It is preferred to employ hydrogen pressures of at least 1500 pounds per square inch, a convenient upper limit being about 10,000 pounds per square inch. The organic reactant may be in either the liquid or gaseous state in the process, although it usually is more convenient to have it in the liquid state. The reaction may be carried out in the presence of any suitable inert organic solvent which is non-reactive with respect to the reactants and the products of the reaction, suitable solvents including mono- and polyhydric alcohols, ethers, esters, ketones, hydrocarbons, and the like.

The following example will illustrate one of the numerous possible specific embodiments of the invention that is more broadly defined in the appended claims.

*Example*

Eighty-seven parts by weight of 2-[2-(2-hydroxyethoxy)ethyl]-1,3-dioxolane and 1 part by weight of Raney nickel catalyst were placed in a pressure resistant hydrogenation vessel. The mixture was subjected with agitation and at a temperature of 260° C. to the action of hydrogen gas under a pressure of 1600 pounds per square inch. At the end of two hours, 0.63 mole of hydrogen per mole of the substituted dioxolane had been absorbed. The contents of the vessel were cooled, the pressure was released, and the catalyst was removed by filtration. Upon fractional distillation of the filtrate, 1,3-bis(2-hydroxyethoxy)propane was recovered in a yield of 15.5% based on the amount of 2-[2-(2-hydroxyethoxy)-ethyl]-1,3-dioxolane employed. The 1,3-bis(2-hydroxyethoxy)propane distilled at 150 to 151° C. under a pressure of 4 mm. Hg.

In its generic concepts, the process of the present invention may be employed for the preparation of numerous 1,3-bis(hydroxyalkoxy)alkanes of the hereindefined class by reacting with hydrogen in the presence of a hydrogenation catalyst, in a manner similar to the foregoing example, suitable derivatives of 1,3-dioxolane and of 1,3-dioxane having a hydroxyalkoxyalkyl substituent group attached to the carbon atom in the 2-position of the heterocyclic ring. The process of the invention is particularly valuable for the preparation of the 1,3-bis(hydroxyalkoxy)propanes within the herein defined class which are completely symmetrical with respect to the central carbon atom of the alkylene group to which the terminal hydroxyalkoxy groups are attached, the said central carbon atom being either a secondary or a tertiary carbon atom, i. e., being attached either to two or to three other carbon atoms. The reaction that is involved in the formation of these completely symmetrical products is thought to be generally as follows:

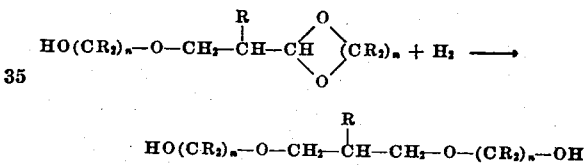

$$HO(CR_2)_n-O-CH_2-\overset{R}{CH}-CH_2-O-(CR_2)_n-OH$$

in which R and n have their previously defined significance, but the divalent groups —(CR_2)_n— are the same. The lower completely symmetrical 1,3-bis(hydroxyalkoxy)propanes, e. g., those containing from 7 to about 15 carbon atoms may have considerable value as special solvents, as plasticizers and the like, and the present process provides a practicable method for the preparation of these potentially valuable products. In a manner similar to the foregoing specific experiment, 1,3-bis(2-methyl-2-hydroxyethoxy)propane may be prepared from 2-[2-(2-methyl-2-hydroxyethoxy)ethyl]-4-methyl-1,3-dioxolane by treatment thereof with hydrogen in the presence of a hydrogenation catalyst, such as Raney nickel, at a temperature of about 250° C. Numerous other valuable polyalkylene glycols of the hereinbefore defined class may be prepared from other 2-[(hydroxyalkoxy)alkyl]-1,3-dioxolanes and 2-[(hydroxyalkoxy)alkyl]-1,3-dioxanes of the herein defined class without exceeding the generic scope of the invention.

We claim as our invention:

1. The method of preparing 1,3-bis(2-hydroxyethoxy)propane which comprises reacting 2-[2-(2-hydroxyethoxy)ethyl]-1,3-dioxolane with hydrogen in the presence of a nickel hydrogenation catalyst at a temperature between about 175° C. and about 300° C.

2. The method of preparing 1,3-bis(2-methyl-2-hydroxyethoxy)propane which comprises reacting 2-[2-(2-methyl-2-hydroxyethoxy)ethyl]-4-methyl-1,3-dioxolane with hydrogen in the presence of a nickel hydrogenation catalyst at a temperature between about 175° C. and about 300° C.

3. The method of preparing 1,3-bis(2-hydroxyethoxy)propane which comprises reacting 2-[2-(2-hydroxyethoxy)ethyl]-1,3-dioxolane with hydrogen in the presence of Raney nickel hydrogenation catalyst at a temperature between about 175° C. and about 300° C.

4. The method of preparing a compound having a structure corresponding to the formula

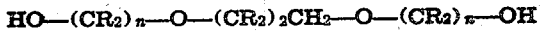

in which each R represents a member of the class consisting of the hydrogen atom and alkyl radicals and $n$ represents an integral number greater than 1 and less than 4, which comprises reacting a compound having a structure corresponding to the formula

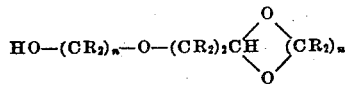

R and $n$ having their above significance, with hydrogen in the presence of a pyrophoric nickel hydrogenation catalyst at a temperature between about 175° C. and about 300° C.

5. Process which comprises subjecting a compound having a structure corresponding to the formula

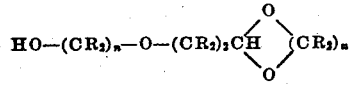

in which each R represents a member of the class consisting of the hydrogen atom and the alkyl radicals and $n$ represents an integral number greater than 1 and less than 4, to the action of hydrogen in the presence of a pyrophoric base metal of group VIII of the periodic table of the elements as the hydrogenation catalyst at a temperature between about 150° C. and about 400° C. to produce a compound having a structure corresponding to the formula

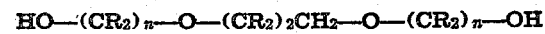

in which R and $n$ have their above significance.

6. Process which comprises subjecting a compound having a structure corresponding to the formula

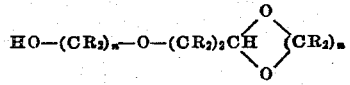

in which each R represents a member of the class consisting of the hydrogen atom and alkyl radicals and $n$ represents an integral number greater than 1 and less than 4, at a temperature between about 150° C. and about 400° C. to the action of hydrogen gas under a pressure of from about 1500 pounds per square inch to about 10,000 pounds per square inch in the presence of a base metal hydrogenation catalyst to produce a product having a structure corresponding to the formula

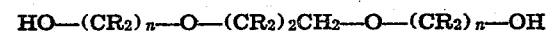

in which R and $n$ have their above significance.

GEORGE W. HEARNE.
HARRY L. YALE.

REFERENCES CITED

The following references are of record in the file of this patent:

UNITED STATES PATENTS

| Number | Name | Date |
| --- | --- | --- |
| 2,122,813 | Groll et al. | July 5, 1938 |
| 2,340,907 | Sussman et al. | Feb. 8, 1944 |
| 2,357,479 | Loder et al. | Sept. 5, 1944 |
| 2,383,091 | Tousaint et al. | Aug. 21, 1945 |